June 10, 1952   R. H. BROWN   2,599,892
APPARATUS FOR REMOVING THE OUTER
LAYERS FROM HARD KERNELED GRAIN
Filed Oct. 15, 1947   3 Sheets-Sheet 2
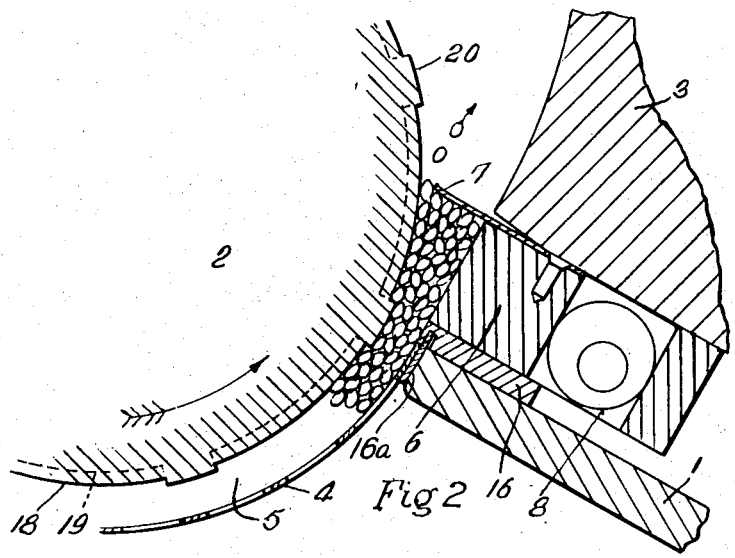
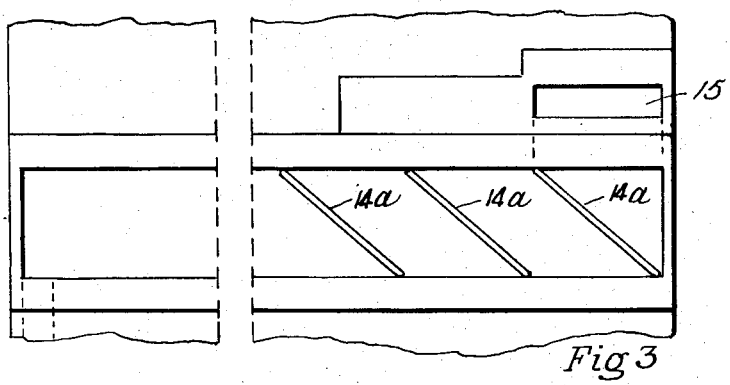
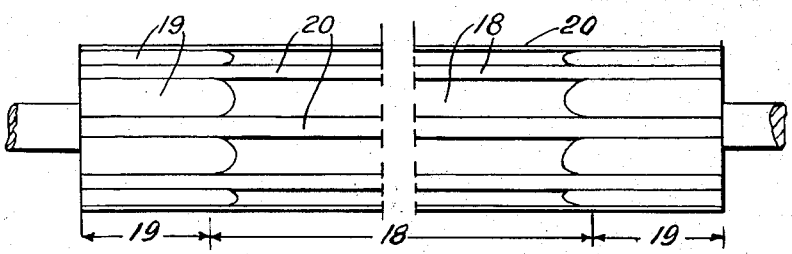
INVENTOR
Robert Henry Brown
BY
George H. Corey
ATTORNEY

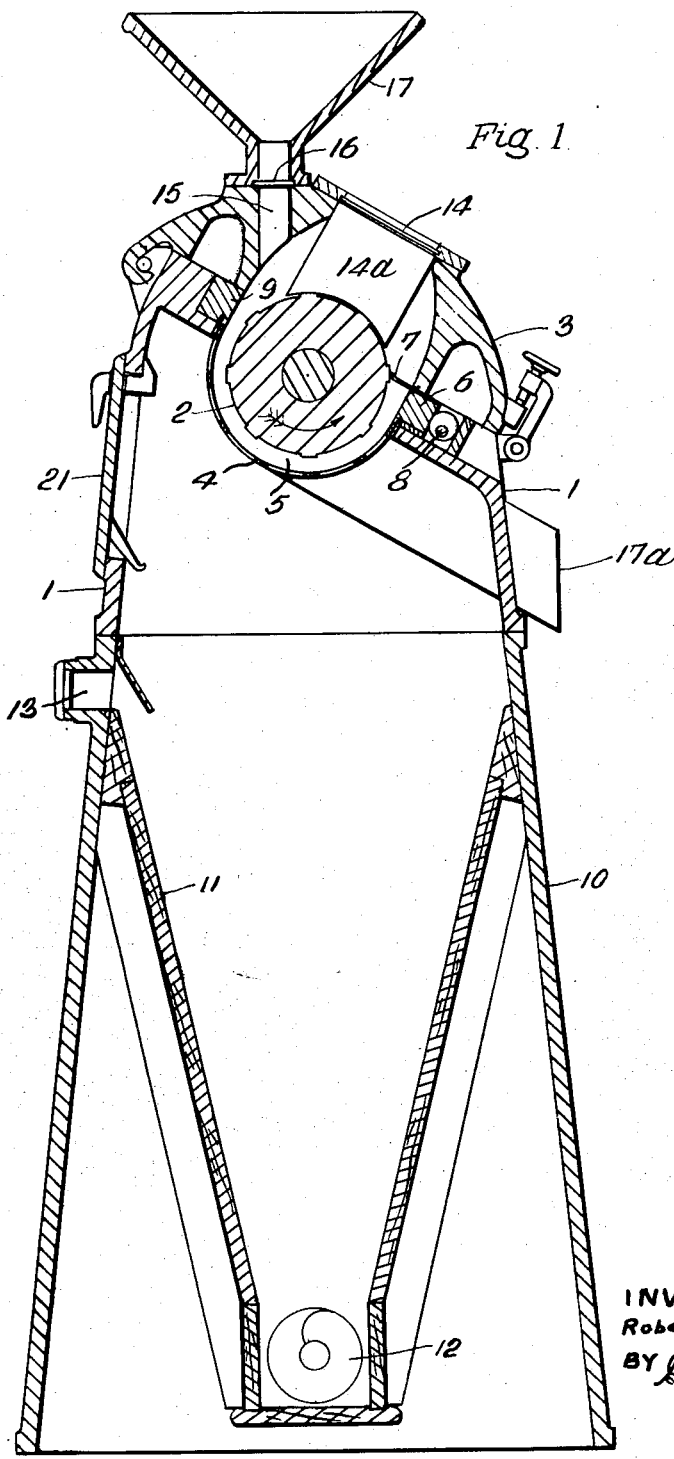

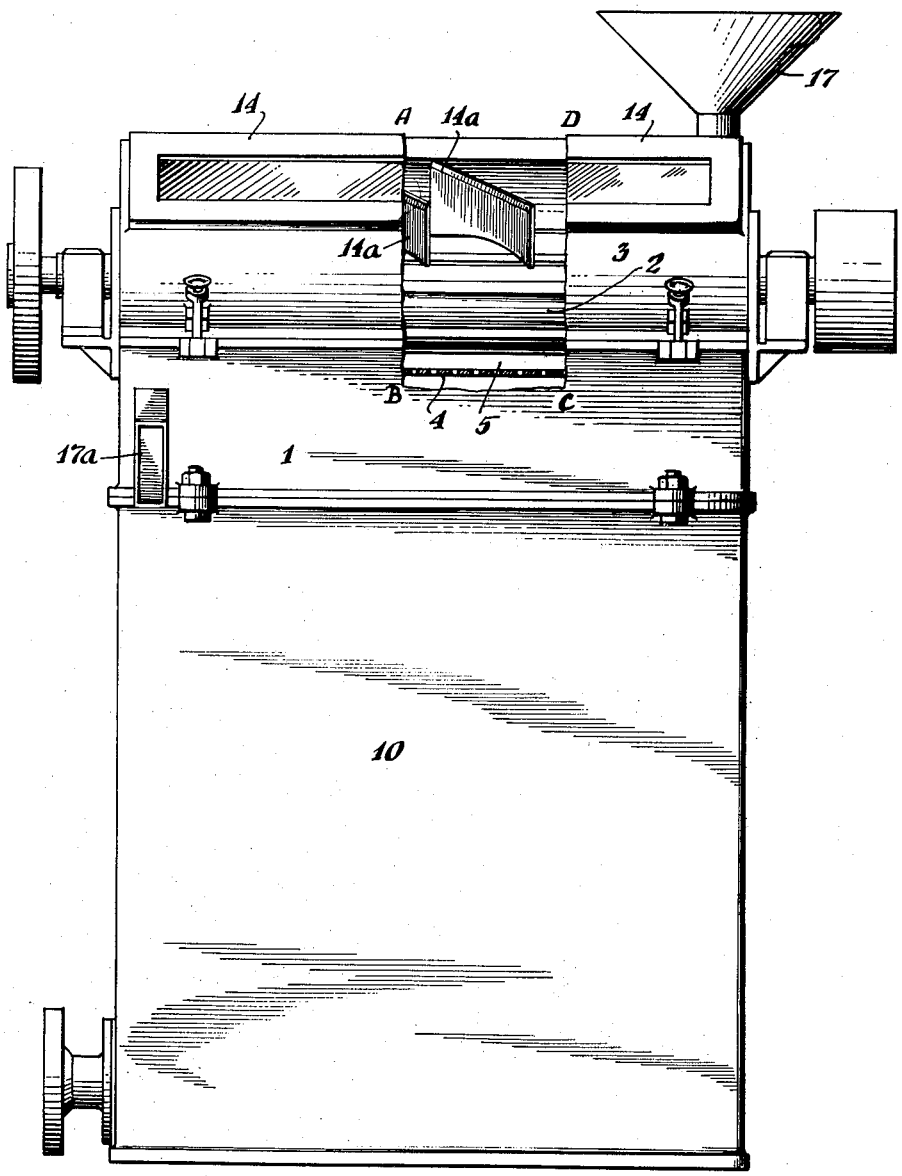

Patented June 10, 1952

2,599,892

UNITED STATES PATENT OFFICE 2,599,892

APPARATUS FOR REMOVING THE OUTER LAYERS FROM HARD KERNELED GRAINS

Robert Henry Brown, Beckenham, England, assignor to W. E. Moulsdale and Company Limited, London, England, a British company Application October 15, 1947, Serial No. 780,014
In Great Britain October 15, 1946

4 Claims. (Cl. 146—277)

This invention relates to an apparatus for removing the outer layers of hard-kernelled grains.

References herein to removing the outer layers of hard-kernelled grains are to be understood as including the removal of the closely adhering fatty skins surrounding the endosperms of rice from which the hard inedible outer hulls have previously been removed by other means, decorticating or shelling raw rice or "paddy," scouring or milling rice which has been subjected to parboiling or other methods of retaining the water-soluble nutrients, pearling barley, shelling or hulling coffee beans or sorghum, or shelling and/or dry scouring small grains, seeds and the like, having relatively hard kernels.

In a known type of machine used for hulling rice and other grain, a horizontally disposed rotor revolves in a concentric casing, grain being fed in at one end into the annular space between the rotor and casing and being removed at the other end. The grain is driven circumferentially around the rotor and an adjustable blade projecting cantileverwise into the circumferential flow is used to brake the velocity of flow and to create packing pressure. In order to advance the grain from the inlet to the outlet, the rotor is spirally grooved. This known machine suffers from the disadvantage that the grain is advanced through the casing by the spiral grooves whilst under a high packing pressure, so that much of the grain is crushed.

According to this invention there is provided an apparatus for removing the outer layers of hard-kernelled grains, comprising a horizontal cylindrical rotor having a grooved surface adapted to entrain grains circumferentially of said rotor, a casing surrounding and spaced from said rotor, a screen in the lower part of said casing adapted to permit egress of outer layers removed from said grains, an inlet adjacent one end of said casing, an outlet adjacent the other end of said casing, means for restricting passage of grains from the lower part of said casing to the upper part of said casing on the up-going side of said rotor, and a plurality of diagonal deflector plates within the upper part of said casing adapted to impart to said circumferentially entrained grains a motion axial of said rotor towards the outlet end of said casing.

It is an advantage of the present invention that the advance of the grain through the machine takes place whilst the grain lies above the rotor, and is free from packing pressure. As a result there is very much less damage to the grain.

The use of deflector plates to forward the grain makes it possible to use straight, instead of spiral grooves, and the grooves may be made shallow so as to remove the outer layers from the grain by a scraping or peeling process as described in more detail hereinafter, and not by a process of attrition.

Preferably the upper part of the casing is enlarged to form a balance chamber in which the grain may be rested and cooled before being returned to the lower screened part of the casing.

The invention will now further be described by way of example with reference to the accompanying drawings, in which:

Fig. 1 is a cross-section of a preferred embodiment of the apparatus intended for single passage operation, Fig. 2 is an enlarged cross section of a portion of the rotor and casing in the neighbourhood of the flow obstructing and pressure applying flexible blade on the upgoing side of the casing, Fig. 3 is a plan of the opening in the hollow cover with the secondary cover removed to show the position of the deflectors employed to move the material axially of the rotor, and Fig. 4 is an external view of the rotor and part of the spindle on which it is mounted.

Fig. 5 is an elevation as viewed from the right in Fig. 1 with a portion of the cover broken away.

Referring now to the drawings the frame housing the several parts of the apparatus comprises a hollow rectangular base 1 provided with a bearing at each end to carry the spindle of a horizontal rotor 2. The base 1 is jointed along an axial plane passing through the axis of the rotor 2 and preferably inclined to the horizontal transverse axis at an angle of 30 degrees, and is surmounted by a hollow cover 3. Within the base 1 is fixed a semicircular screen 4, preferably of perforated steel, along the whole length of the rotor 2, with its upper edges lying at the same angle as the joint between the base 1 and the cover 3 and its inner surface concentric with the rotor 2 so as to form a semi-annular screened space 5 surrounding the lower half of the rotor. Between the base 1 and the cover 3 just above the upper edges of the screen 4 are provided two recesses along the full length of the inner surface of the casing and within the recess on the upgoing side of the rotor is housed a rigid holder bar 6 to which is fixed one edge of a thin strip 7 of tempered spring steel or other suitable wear resisting and flexible material, with its other free edge projecting into the space between the rotor and the casing. The holder bar 6 is provided with means for moving it towards or away from the rotor so as to vary the clearance between the inner edge of the flexible strip or blade 7 and the surface of the rotor, preferably in such a manner that the holder bar 6 and the blade 7 move always truly parallel to the rotor and preferably actuated by cams 8 on a spindle supported at each end of the casing and moved by handwheels or other suitable devices from either end of the machine while the machine is running and preferably provided with a dial and pointer showing the clearance setting on a magnified scale. Optionally a similar holder and blade may be fitted in a corresponding recess on the downgoing side of the rotor or the latter recess may be fitted, as shown in the drawing, with a filler bar 9 so as to make the inner wall of the casing continuous above the screen 4. The base may be in one piece but preferably is constructed in two sections, an upper section 1 housing the rotor 2 and screen 4 which is mounted on an independent floor base 10 arranged to carry one or more upper housings as may be required for single or series working. The lower section or floor base 10 may suitably be provided with an internal hopper 11 to collect the outer layer impurities scoured off the grains and discharged through the screen 4, and may be provided with a worm conveyor 12 or other type of conveyor to deliver the said impurities outside the machine, and may also be provided with an air collecting branch 13 for connection to a fan or central exhaust system whereby air may be drawn through the material under treatment and through the screen in order to keep the material cool and the screen apertures from being clogged with bran or mealy particles.

The hollow cover 3 surmounting the base is preferably made so that the cross sectional area of the balance chamber which it forms over the rotor 2 is considerably greater than the semi-annular area 5 enclosed by the screen 4 and with an open top over its central part closed by a secondary cover or lid 14 provided with glazed openings through which the movement of the material circulating through the main cover 3 can be observed while the machine is in operation. The main cover 3 is provided with an inlet opening 15 at one end preferably off-set transversely to the centre line of the machine so that the material is delivered into the casing directly over the rotor on its downgoing side, the inlet opening 15 being preferably provided with a regulating slide 16 to control the rate at which the material is admitted into the casing and a hopper 17 over same into which the material is delivered. The regulating slide 16 may suitably be provided with means for fixing it at any desired area of opening and a graduated index showing the amount of opening. Within the opening under the secondary cover 14 deflectors 14a are fitted diagonally across the casing above the rotor, the first of which deflectors at the feed end of the casing is fixed with its forward edge on the upgoing side of the rotor close to the end wall of the cover and slopes diagonally therefrom over a distance approximately equal to the length of the feed inlet 15, with its forward surface facing the flow of material circulating through the cover whereby the material on impinging against the said deflector is diverted axially of the rotor towards the opposite or outlet end of the casing. The lower edge of the deflectors is shaped so that it fits closely to the surface of the rotor, preferably with running clearance only, and any number of such deflectors may be fitted at intervals along the length of the cover as may be necessary to divert the material far enough along the cover to ensure the semi-annular screened area 5 being kept full of grains in close contact therein until discharged. The depth and cross sectional area of the cover 3 are so proportioned that the grains while passing through the cover at maximum rate of throughput are not subjected to appreciable packing pressure but lie loosely over the rotor, the cover thus acting as a balance chamber in which the material is well mixed, rested, and cooled between each circuit of the casing and moves easily axially of the rotor under the end thrust of the inflowing stream of grains diverted axially of the rotor by the deflectors 14a.

The semi-circular screen 4 is preferably made of hard tempered perforated steel with perforations elongated in the direction of flow circumferentially of the rotor and staggered axially. It is housed within the base 1 with its upper edges flush with the joint between the base 1 and the cover 3 and is preferably reinforced along its top edges by a longitudinal steel strip 16a (see Fig. 2) the top of which projects slightly above the top of the screen and fits into a corresponding groove in a plate 16 secured to the base 1. The screen 4 may suitably be supported at spaced intervals by narrow bars fixed in the base below and is withdrawable from above. An outlet for the material is preferably provided by an opening in the lower periphery of the screen 4 at the opposite end to the feed inlet and registering with an inclined delivery spout 17a passing through the side of the base 1, but various alternative methods of delivering the treated materials may be employed as, for example, by a delivery spout through the end of the base, or through an opening in the cover 3 instead of in the screen 4.

The rotor 2 is preferably cast of very hard deeply chilled iron ground truly cylindrical and its periphery then cut with spaced grooves 18, 19 parallel to its axis or very slightly spiralled thereto with intervening projections or teeth 20 along its whole length, the said teeth having wide smooth crowns with sharp arrises at each edge on the periphery. Alternatively the body of the rotor may be cast and machined or ground cylindrical and shallow projections or teeth affixed thereto at spaced intervals by suitable means. The space, width and depth of the grooves and the speed of the rotor are so co-related that grains on entering the casing through the feed inlet opening and packing around the rotor on its downgoing side are entrained within the grooves and driven round the casing circumferentially of the rotor. Throughout the greater part of the length of the rotor the grooves, as shown at 18, have a depth which is not substantially greater than one half the average thickness of the grain and preferably does not exceed 1 millimetre but over a length of the rotor corresponding to the length of the inlet opening at the feed end the grooves, as shown at 19, are cut deeper, to say 3 or 4 millimetres. The spindle may be fixed in the rotor by any approved known method and preferably the two ends of the spindle beyond the rotor are made of exactly the same diameter and length so that the rotor and spindle may be turned end for end so as to utilise the other working edge of the teeth after the first edge has become too blunted for efficient use, and for this purpose the rotor grooves may suitably be deepened at both ends as already described for the feed end.

The length of the rotor and casing which may be employed is only limited by constructional considerations—no limit being imposed by operational consideration.

In operating the machine for treating rice it is generally preferable that the grains should first be freed from most or all of the hard inedible hulls by prior treatment in machines specially devoted to that purpose, leaving only the pericarp and seed coat layers closely adhering to the endosperm to be removed by the machine herein described, but it is a feature of the latter that the action as employed for removing the said adhering layers will also, without modification of any of the working parts, effect the removal of the hulls from unshelled grains and deliver clear or whitened rice in a single passage. Thus the necessity for independent paddy separating machines and plant, whether used in series with machines effecting prior removal of the hulls, or used alone for producing white or cleaned rice direct from paddy, is eliminated, thus greatly simplifying the processing of rice as a cereal foodstuff, and greatly reducing the number of machines and size of building required for a given output of cleaned rice, as well as the power consumption.

The method of operating the machine shown in the drawings will now be described by way of example as applied to the whitening of shelled rice by removing the adhering bran or meal skins from the outer surface of the edible kernels.

With the rotor revolving in the direction of the arrow shown in Figs. 1 and 2 and shelled rice flowing into the hopper 17, the feed gate 16 is opened and the rice to be treated flows through the inlet opening 15 in the cover 3 into the semi-annular space 5 between the rotor 2 and hemi-circular screen 4, spreading along the casing and piling at its natural flow angle into the screened space on the downgoing side and lying in contact with the rotor face, the grains entering the grooves of the latter being pulled round and thrown out into the semi-annular screened space until the latter is filled up to the obstruction formed by the flexible blade 7 on the upgoing side. The inner layer of grains next the rotor together with the grains entrained within the deepened grooves 19 at the feed end of the rotor are then pulled past the inner edge of the blade 7 and are thrown into the cover 3, whence the grains are again entrained in the deepened grooves 19 and on impinging against the forward surface of the first deflector 14a in the enlarged balance chamber beneath the cover 14, the incoming stream of rice after its first circuit of the casing is diverted axially of the rotor past the feed inlet opening 15, thus allowing fresh feed to flow continuously into the casing as fast as the circulating stream is displaced axially. After being diverted by the first deflector 14a the rice spreads along the cover 3 over the shallow grooves 18 of the rotor within which the grains cannot be fully entrained, and the grains thrown over from the upgoing side can only re-enter the downgoing stream at the same rate as the inner grains are driven through the restricted opening past the flexible blade 7 on the upgoing side. The stock therefore spreads along over the top of the rotor in the balance chamber under the force of the incoming stream from the deeper grooves 19 of the rotor at the feed end until the volume of the single layer flow past the blade 7 thrown over by the shallow grooves 18 equals that thrown over by the deeper grooves 19. If only one deflector 14a were fitted the stock would then pile again on the down-going side at its natural flow angle as at the feed end on first flowing into the casing and further axial movement towards the outlet opening would be very slow as the piling would gradually extend along the screened scouring space until the lower end of the pile reached the outlet opening in the bottom of the screen and began to discharge grains as they flowed down the natural slope of the pile. By inserting a sufficient number of deflectors 14a according to the length of the rotor employed, the balance chamber, however, can be kept filled with stock throughout its length and grains will be then thrown out by the deep grooves 19 at the outlet end of the rotor at the same rate as they are drawn in at the inlet end, which latter rate is controlled by regulating the feed gate 16 and/or by adjusting the clearance between the rotor and the flexible blade 7 and consequently increasing the intensity of the pressure applied over the inner grains by which they are kept pressed against the rotor face or reducing the same according to the degree of whiteness desired in the delivered product. As the teeth of the rotor are parallel to the axis of the latter they drive the grains round the casing in a diametral plane only so that in the screened scouring space 5 no end thrust is built up and the packing pressure is applied radially only therein. While the stock is passing through the balance chamber the only radial pressure is due to the small weight of stock lying over the top of the rotor, and there is only a slight end thrust due to the force of the stream of incoming grains diverted axially by the deflectors 14a, so that all axial movement of the stock is imparted whilst it is free of any appreciable packing pressure.

The action by which the outer adhering layers of bran or meal are removed from the convex surfaces of the grains is as follows: the rotor working surface sweeps continuously over the inner surface of the inner layer of grains filling the casing from end to end, and this inner layer is driven circumferentially of the rotor by impacts from the sharp leading arrises of the teeth of the shallow grooved central section of the rotor. Over this section of the rotor the grains cannot be deeply entrained in the grooves 18 and considerable slip of teeth over the grains takes place and the velocity imparted to the grains is considerably lower than the surface velocity of the rotor so that each grain receives a great number of these sweeping impacts whilst it is in contact with the rotor face, and the mass of stock within the casing is kept in constant inter-granular movement outwards and inwards and subjected to rapid pulsations of alternate squeeze and release as a tooth slips inside of a grain and so pushes it outwards into the outer layers and the displaced grains surge inwards again to fill the succeeding groove after the tooth has passed on. The movements are slight but while within the semi-annular screened scouring space 5 the grains are tightly packed in the neighborhood of the blade 7 on the upgoing side, and as the outermost grains are prevented from moving further out by the surrounding screen they must slide over each other circumferentially and their outer surfaces are rubbed hard together as the grains are displaced circumferentially under each rapidly succeeding outward pulsation. During each slipping sweep of tooth over grain the convex contour of the grain is kept pressed hard against the sharp leading arrise of the tooth so that the bran or meal is scraped or peeled off a considerable arc of its inner surface at each sliding impact and this action is repeated a great number of times during each circuit of the casing. The outer surface of the inner layer grains is also subjected to a similar scraping or peeling action as they are driven past the resiliently yielding edge of the flexible steel blade 7. The combined direct peeling action and the inter-granular movement and rubbing under packing pressure of considerable intensity, but within the capacity of the grain to withstand without serious breakage of sound grains free from suncracks, effect very rapid removal of the outer bran layers with minimum avoidable breakage. Both the peeling action of the rotor teeth and the inter-granular movement and rubbing continue throughout the passage of the grains through the balance chamber, but here the outermost grains are not confined and the radial pressure against the rotor face is relatively light, so that the inner layer grains are easily mingled with the outer grains by the centrifugal force due to their greater velocity and an energetic mixing action is set up which ensures a very uniform removal of bran from every grain and from every part of the surface of each grain by the time it has completed its travel through the very long casing practicable with the method of axial movement of the stock as described. The glazed windows in the secondary cover 14 over the balance chamber allow convenient observation of the flow through the latter while the machine is running and shows the progressive removal of the bran and whitening of the grains as they travel along the casing.

The pressure applied over the inner grains by the resiliently yielding flexible blade 7 is adjustable by regulating the amount of clearance between the inner edge of the blade and the outer surface of the rotor. This may be effected in various ways, but preferably as shown in the drawings the adjustment is effected by cams 8 by which the blade movement is kept automatically similar at both ends of the casing, and the amount of the clearance is indicated on a magnified scale by a pointer and graduated dial at the outer end of the casing (not shown in the drawings). The said cams can be easily adjusted while inspecting the delivered product through the outlet spout 17a. An inspection door 21 in the base 1 allows the discharge of bran through the screen being inspected when desired.

The bran or meal scoured off the grains and discharged through the screen apertures fall by gravity into the hopper 11 in the floor base 10, and is discharged through one end of the latter by the conveyor worm 12. The hopper may be exhausted through a branch pipe 13 at one side of the floor base, for connection to a fan or central exhaust system. The floor base may be arranged to accommodate two or more of the machines as described at different heights and staggered horizontally for milling in series, the product from the delivery outlet spout of one machine being delivered into the inlet hopper of the machine below, and the said floor base may be hoppered to deliver the bran scourings from each machine separately or from all collectively, with or without integral conveyors.

The machine may be driven by belt or other suitable means and when provided with a conveyor or conveyors in the floor base for collecting and delivering the scourings discharged through the screen, the conveyor or conveyors may suitably be driven by a subsidiary belt or belts from the main rotor drive spindle.

The machine may also be used for producing cleaned or white rice direct from raw paddy in one or more operations or for any of the other purposes described in the foregoing specification, the method of operation being generally similar to that described for removing the adhering bran or meal layers from shelled rice, but the proportions of the rotor grooving and teeth may be varied to suit the size of grains or seeds to be treated.

I claim:

1. Apparatus for removing the outer layer of hard-kernel grains, comprising a horizontal cylindrical rotor having on its periphery a plurality of straight continuous tooth projections extending approximately parallel to the axis of said rotor, a lower part-cylindrical screen defining a relatively narrow part-annular space around the lower portion of said rotor between the ends thereof, a casing cooperating with said screen to enclose said rotor and extending about the upper side of said rotor to provide a relatively deep balance chamber above and substantially throughout the length of said rotor, said casing being provided with an inlet opening communicating with said balance chamber adjacent one end of said rotor, said screen being provided with an outlet opening adjacent the opposite end of said rotor and disposed below said rotor adjacent the upgoing side thereof, said tooth projections on said rotor having wide smooth crown surfaces forming sharp lengthwise edges with surfaces thereof extending generally radially, said projections being circumferentially interspaced with wide smooth-floored shallow grooves, the depth of said grooves along the length thereof between said inlet and said outlet openings not substantially exceeding one-half the average diameter of the grains but sufficient to carry in said grooves a single grain depth of said grains, a horizontally extending resiliently flexible strip supported adjacent the joint between said wall of said casing and said screen at the upgoing side of said rotor and projecting cantileverwise towards said rotor with its longitudinal edge adjacent said rotor, the radial depth of said annular space being sufficient to confine therein at least adjacent said flexible strip additional grains in multi-grain radial depth overlying and in contact with said grains carried by said rotor, said longitudinal edge of said strip being spaced from said groove floors of said rotor a distance less than said average grain diameter and with clearance with respect to said crowns of said tooth projections to restrict the grains bodily carried by said rotor past said strip to the grains in said shallow grooves while providing for movement past said longitudinal edge of said strip of additional grains from said overlying grains within said annular space adjacent said strip concomitantly with flexure of said strip transversely of the length thereof, said strip providing a hard surface in contact with said grains and exerting a resiliently yielding pressure against the surfaces of the grains moved past said projecting edge of said strip to remove the adhering outer layers from said grains, and means disposed in said balance chamber and cooperating with said rotor to urge the grains in said balance chamber to move lengthwise along the rotor towards said outlet.

2. Apparatus for removing the outer layers of hard-kernel grains as defined in claim 1 in which said inlet opening is disposed laterally with respect to the axis of said rotor over the down-going side of said rotor as it rotates on said axis.

3. Apparatus for removing the outer layers of hard-kernel grains as defined in claim 1 in which said means in said balance chamber comprises a plurality of deflector plates supported within said chamber obliquely inclined with respect to the axis of said rotor and having their lower edges conforming to the circumference of said rotor in running clearance with respect to said tooth projections.

4. Apparatus for removing the outer layers of hard-kernel grains as defined in claim 1 which comprises means operatively connected to said resiliently flexible strip and operable for moving said strip toward and away from said rotor to vary the distance between said longitudinal edge of said strip and said rotor.

ROBERT HENRY BROWN.

REFERENCES CITED

The following references are of record in the file of this patent:

UNITED STATES PATENTS

| Number | Name | Date |
| --- | --- | --- |
| 525,813 | Lipe | Sept. 11, 1894 |
| 693,930 | Van Houten | Feb. 25, 1902 |
| 750,610 | Couch | Jan. 26, 1904 |
| 770,226 | Dieterich | Sept. 13, 1904 |
| 836,011 | Camargo | Nov. 13, 1906 |
| 1,242,136 | Buffum | Oct. 9, 1917 |
| 1,477,262 | Hayes | Dec. 11, 1923 |

FOREIGN PATENTS

| Number | Country | Date |
| --- | --- | --- |
| 76,523 | Austria | May 26, 1919 |